United States Patent
Bank et al.

(10) Patent No.: US 10,318,276 B2
(45) Date of Patent: *Jun. 11, 2019

(54) OPTIMIZED INSTALLATION OF RECEIVED PATCHES FOR APPLICATION PROGRAMS ALREADY RUNNING ON COMPUTER SYSTEMS

(71) Applicant: International Business Machines Corporation, Armonk, NY (US)

(72) Inventors: Judith Helen Bank, Morrisville, NC (US); Liam Harpur, Dublin (IE); Ruthie D. Lyle, Durham, NC (US); Patrick Joseph O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,991

(22) Filed: Sep. 4, 2017

(65) Prior Publication Data

US 2017/0364351 A1    Dec. 21, 2017

Related U.S. Application Data

(63) Continuation of application No. 13/684,921, filed on Nov. 26, 2012, now Pat. No. 9,760,361.

(51) Int. Cl.
*G06F 8/65*    (2018.01)

(52) U.S. Cl.
CPC ..................... *G06F 8/65* (2013.01)

(58) Field of Classification Search
None
See application file for complete search history.

(56) References Cited

U.S. PATENT DOCUMENTS

| | | |
|---|---|---|
| 2004/0111702 A1 | 6/2004 | Chan |
| 2004/0177352 A1 | 9/2004 | Narayanaswamy et al. |
| 2005/0251787 A1 | 11/2005 | Dietrich et al. |
| 2005/0289536 A1 | 12/2005 | Nayak et al. |
| 2006/0179418 A1 | 8/2006 | Boyd |
| 2006/0206861 A1 | 9/2006 | Shenfield et al. |
| 2006/0265719 A1 | 11/2006 | Astl et al. |

(Continued)

OTHER PUBLICATIONS

"SCA Service Component Architecture, Assembly Model Specification"; SCA Version 0.96 draft 1; Aug. 2006; pp. 1-89.

(Continued)

*Primary Examiner* — Syed A Roni
(74) *Attorney, Agent, or Firm* — Steven M. Greenberg, Esq.; Shutts & Bowen LLP

(57) ABSTRACT

A data patch for a program already installed in an interactive display computer system is received over a network and stored. There is also received a first set of parameters for controlling the installation of the patch. At the computer, a second set of parameters for controlling optimum installation time periods is predetermined wherein the data patch may be installed. The first and second sets of parameters are correlated to determine a set of optimum time periods during which the data patch may be installed, and this set of time periods are displayed so that a user may interactively select an optimum time period for installation of the data patch.

24 Claims, 6 Drawing Sheets

(56) References Cited

U.S. PATENT DOCUMENTS

| | | | |
|---|---|---|---|
| 2008/0201702 A1* | 8/2008 | Bunn | G06F 8/67 |
| | | | 717/171 |
| 2008/0270974 A1 | 10/2008 | Topchiyski et al. | |
| 2009/0089777 A1* | 4/2009 | Fuller | G06F 8/65 |
| | | | 717/174 |
| 2009/0276770 A1 | 11/2009 | Taieb et al. | |
| 2013/0346955 A1* | 12/2013 | Cudak | G06F 8/65 |
| | | | 717/168 |

OTHER PUBLICATIONS

International Business Machines Corporation; "WebSphere Integration Developer"; Version 6.0.2; Fourth Edition; Dec. 2006; pp. 1-28.

* cited by examiner

OPTIMIZED INSTALLATION OF RECEIVED PATCHES FOR APPLICATION PROGRAMS ALREADY RUNNING ON COMPUTER SYSTEMS

This application is a Continuation of U.S. patent application Ser. No. 13/684,921, filed Nov. 26, 2012, now U.S. Pat. No. 9,760,361 the entirety of which is incorporated herein by reference.

TECHNICAL FIELD

The present invention relates to the installation of data patches received at computer systems for application programs already running on the computer systems and particularly for security patches intended to correct vulnerabilities in the application programs that allow an invading attacker, e.g. hacker, to compromise a computer system's information assurance.

BACKGROUND OF RELATED ART

Application program distributors frequently find it necessary to widely distribute a data patch intended to correct a significant problem in the operability of the distributed application program. Such data patches are particularly used to correct defects in widely distributed application programs that may be installed and running on thousands of computer systems. Such patches may be distributed over public networks, such as the Internet or World Wide Web (Web) or over private networks with proprieties to particular organizations.

The users and distributors of application programs distributed over public and private or prioritized networks are greatly concerned with vulnerabilities in distributed application programs that may cause breaches permitting attackers to hack user propriety data. However, major business organizations, banks and governments consider themselves to be very vulnerable to security breaches in the distributed application programs. Banks, large corporations and the government may have distributed a vast number of a particular application program that have been installed and are running in the organization's networked computer systems. When a security vulnerability is discovered, a corrective data patch for the program must be expeditiously developed and sent to the computer systems for quick or immediate installation.

SUMMARY OF THE PRESENT INVENTION

The present invention is directed toward the optimum installation of data patches that satisfies the security vulnerabilities, in an effective manner with minimum slowing or interruption of computer system operations. When a data patch for a program already installed in an interactive display computer system is received over a network such as the Internet, the patch is stored so it will be available. Along with the patch, there is sent and received a first set of parameters for controlling the installation of the data patch. At the computer system, there is predetermined, a second set of parameters for controlling optimum installation time periods on the computer system's calendar, wherein said data patch may be installed. The first and second sets of parameters are then correlated to determine a set of optimum time periods on the system calendar wherein the data patch may be installed, and this set of time periods are displayed so that a user may interactively select an optimum time period for installation of the data patch. Under certain circumstances, particularly when the installation requires rebooting of the computer, the set of time periods displayed will consist of a single tile period. A parameter in the first set of parameters accompanying the received data patch may be that the data patch is a hot patch requiring a prompt installation. Another parameter may be the duration of time required for the installation of the data patch.

According to another aspect of the invention, a plurality of data patches, each patch accompanied by its own first set of parameters are received and stored. When there are such a plurality of received data patches, then when a parameter in said first set of parameters of one of said first sets of parameters requires a reboot of the computer system the displayed set of optimum time periods may consist of a single time period, the duration of time required for said reboot of the computer system.

The second set of parameters of the computer system may include computer operating conditions requiring computer system times. This second set of parameters of the computer system may include computer calendar schedules.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
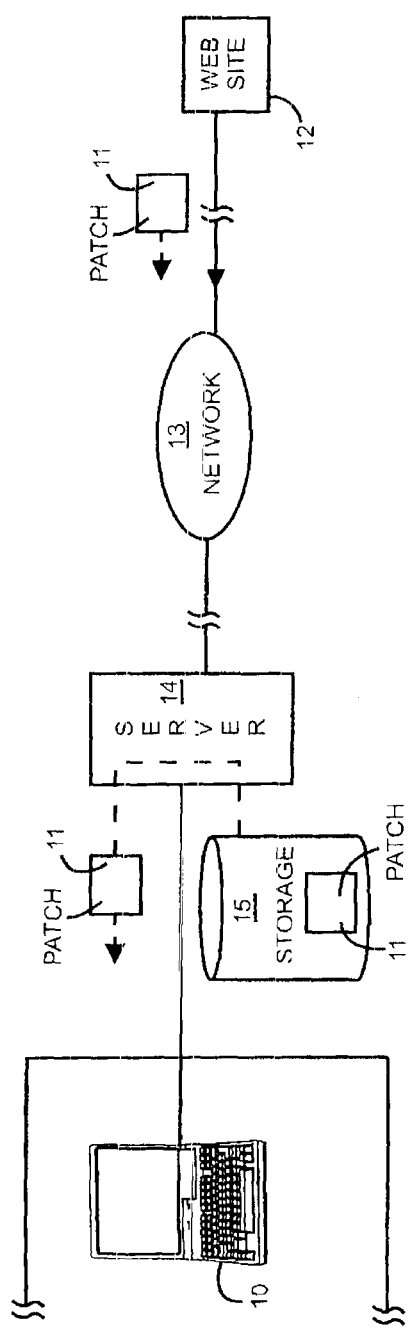
FIG. 1 is a generalized diagrammatic view of a network portion illustrating the provision of a data patch from source distributor of the already installed computer program.

Referring to FIG. 1, there is shown a generalized diagrammatic view of a network portion illustrating the provision of a data patch from source distributor of the already installed computer program. When a vulnerability is uncovered for an application program already installed and running on a computer system 10 equipped with an interactive display, the distributor responsible for the program at site 12 will develop and send a corrective data patch 11 via a public network 13 such as the Internet or via a private organization network and to other computer systems (not shown) via branches 16 and 17. The patch 11 is stored in storage 15 associated with and under control of server 14 wherein the installation of the patch 11 in the application program running on computer system 10 will be synchronized with server 14 for an appropriate installation period of time, which should be optimum in that the intrusion of the continued operation of a computer system is minimized.

In accordance with the present invention, e.g. part of patch 11 is a first set of parameters related to the patch for controlling the installation of the patch. Such a first set of parameters could include an estimated patch or fix installation duration, i.e. the approximate time that it would take to apply the fix to the computer system 10. In the case where multiple fixes are to be applied, a cumulative estimated fix installation and a worst case disruption indicator could be determined. For example, if three fixes would be determined to cumulatively require twenty minutes for installation, but only one of the fixes would require a reboot, the worst case indicator would be determined to be a system reboot.

In accordance with the present invention, the data in this first set of parameters would be coordinated, and then correlated with a second set of parameters associated with computer system 10 and resident on the computer system or on server 14. This second set of parameters should define the optimum time periods insofar as the calendar of the computer system is concerned, e.g. available slots on the calendar, calendar scheduled events that are able to be changed, as well as unchangeable scheduled events.

The correlation of the first and second sets of parameters would then result in data defining a calendar event. The calendar event data could include: a list of the fixes (patches) to be applied; a local or remote pointer to the fixes; an estimated duration of installation; a disruption indicator; the required time period within which the patch or fix must be applied to the computer system; and if the application fix is mandatory. It is noted that the required time period data would be used to manage user attempts to reschedule the fix for an alternative time slot on the calendar, and would also ensure that the necessary security requirements were met in a timely manner.

The results of the correlation of the first and second sets of parameters to provide the interactive display on the display screen of computer system will be subsequently described in FIGS. 3 and 4. However, once a user selects a calendar event wherein the patches may be installed, the scheduled event could still be changed by the user as a result of changes in the user's calendar. If an earlier time slot becomes available, the scheduled installation event could be moved up in time. Alternatively, if a current time slot becomes double booked, the event could be moved up if needed.

Also, if the patch is not identified as mandatory, the user could cancel the calendar event for installation or push the event out to a later time without being constrained by a required time frame for installation.

Figure 2:
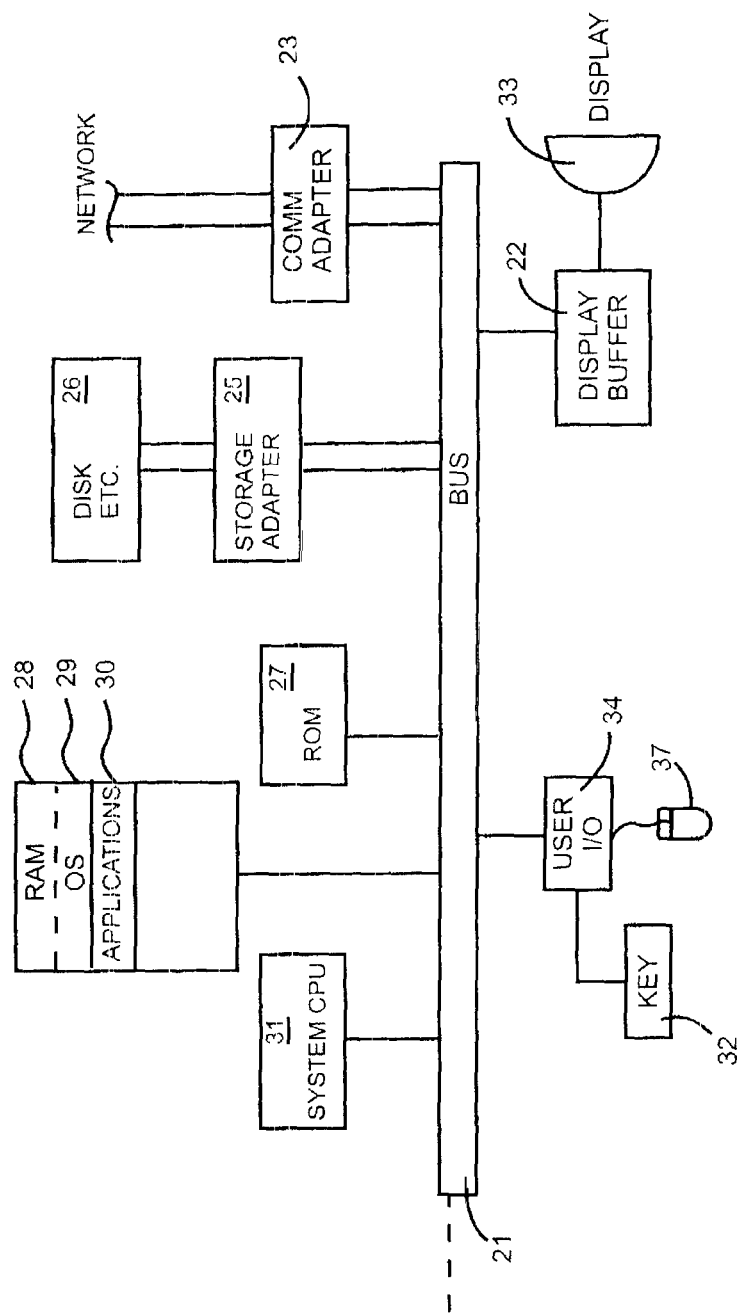
FIG. 2 is an illustrative diagrammatic view of a computer system that may be used for either the computer system 10 or server 14 of FIG. 1.

Before proceeding with the description of the user interactive dialog to select a patch installation time slot with respect to FIGS. 3 and 4, there will first be described, with respect to FIG. 2, an illustrative diagrammatic view of a computer system that may be used for the computer 10 or server 14 of FIG. 1. A central processing unit (CPU) 31, such as one of the microprocessors from System p series available from International Business Machines Corporation (IBM), is provided and interconnected to various other components by system bus 21. An operating system (OS) 29 runs on CPU 31, provides control and is used to coordinate the function of the various components of FIG. 2. Operating system 29 may be one of the commercially available operating systems. Application programs 30, controlled by the system, are moved into and out of the main memory Random Access Memory (RAM) 28. These programming applications may be used to implement functions of the present invention. Alternatively, the programs used to implement the present invention be stored in a Read Only Memory (ROM) 27 connected to CPU 31 via bus 21. ROM 27 includes the Basic Input/Output System (BIOS) that controls the basic computer functions of the computer system. RAM 28, storage adapter 25 and communications adapter 23 are also interconnected to system bus 21. Storage adapter 25 communicates with the disk storage device 26 that may be implemented as storage 15 in FIG. 1. Communications adapter 23 interconnects bus 21 with the outside network. I/O devices are also connected to system bus 21 via user interface adapter 34. Optionally, keyboard 32 and mouse 33 may be connected to bus 21 through user interface adapter 34. Display buffer 22 supports display 33.

Figure 3:
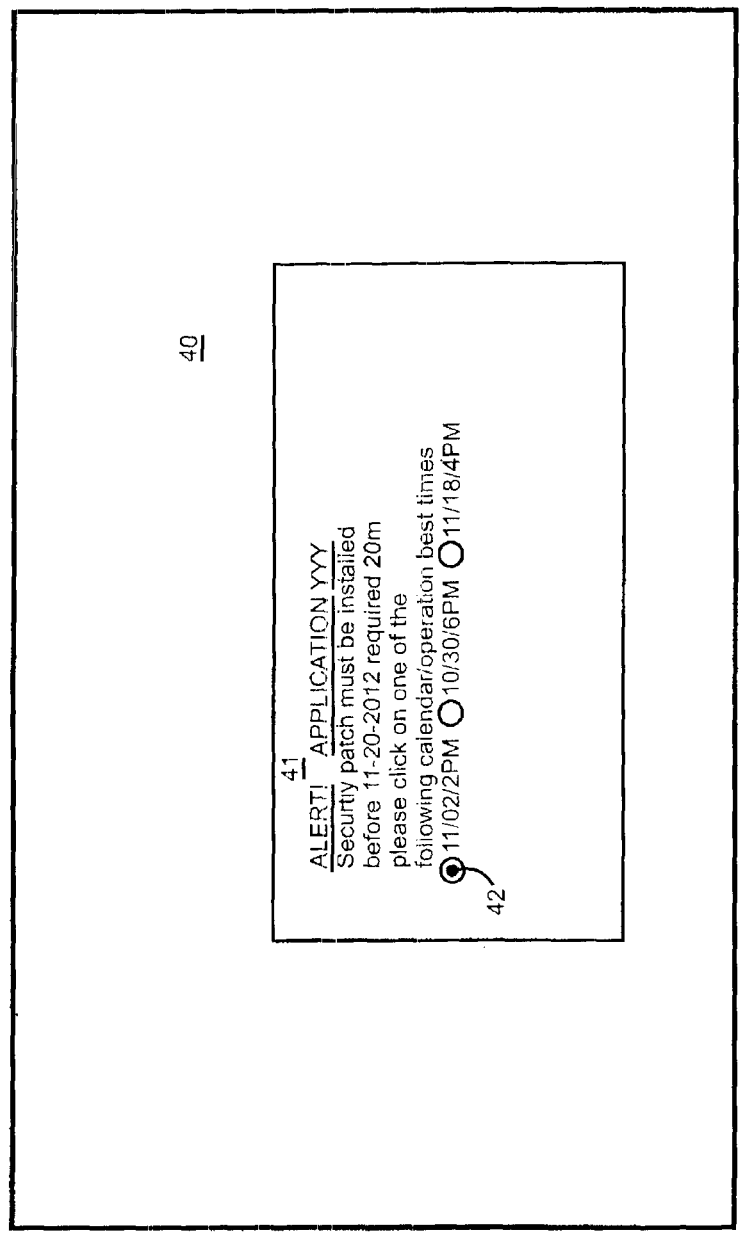
FIG. 3 is a diagrammatic view of a display screen on the receiving computer system with an interactive dialog box alerting the user to a received corrective data patch, and presenting the user with optimum time periods during which the patch may be installed.

Now with respect to FIG. 3, there is shown a diagrammatic view of a display screen on the receiving computer system with an interactive dialog box alerting the user to a received corrective data patch, and presenting the user with optimum time periods during which the patch may be installed in accordance with the correlations of the first and second set of parameters. During an operation on computer display screen 40, dialog box 41 pops up. This dialog box is developed in response to the correlation of the first and second parameter sets. As a result, it has been determined that there are the three time periods available to the user. The user has interactively selected 42 the 11/02/2 PM time slot.

Figure 4:
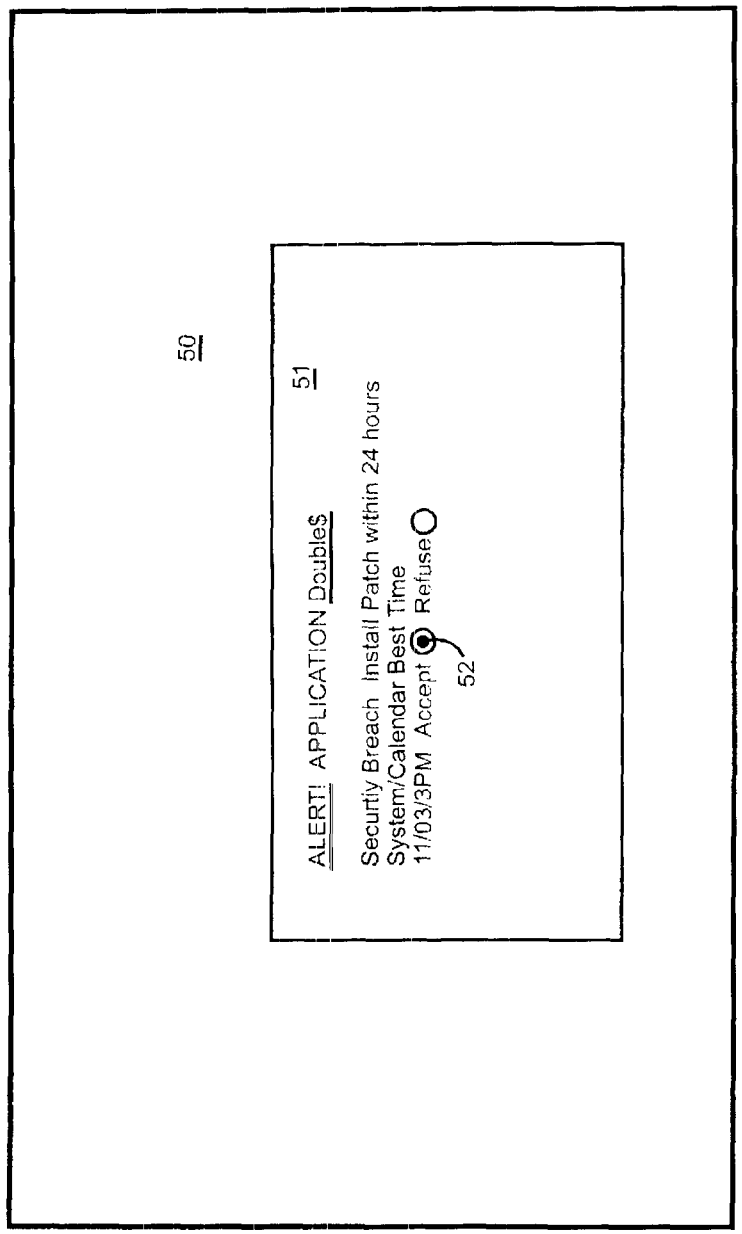
FIG. 4 is a diagrammatic view of a display screen on the receiving computer system with an interactive dialog box alerting the user to a received corrective data, patch, and presenting the user with only one time period during which the patch must be installed.

With respect to FIG. 4, there is shown a diagrammatic view of a display screen 50 on the receiving computer system with an interactive dialog box 51 alerting the user to a received corrective data patch, and presenting the user with only one time period during which the patch must be installed. The user may accept 52 or refuse.

Figure 5:
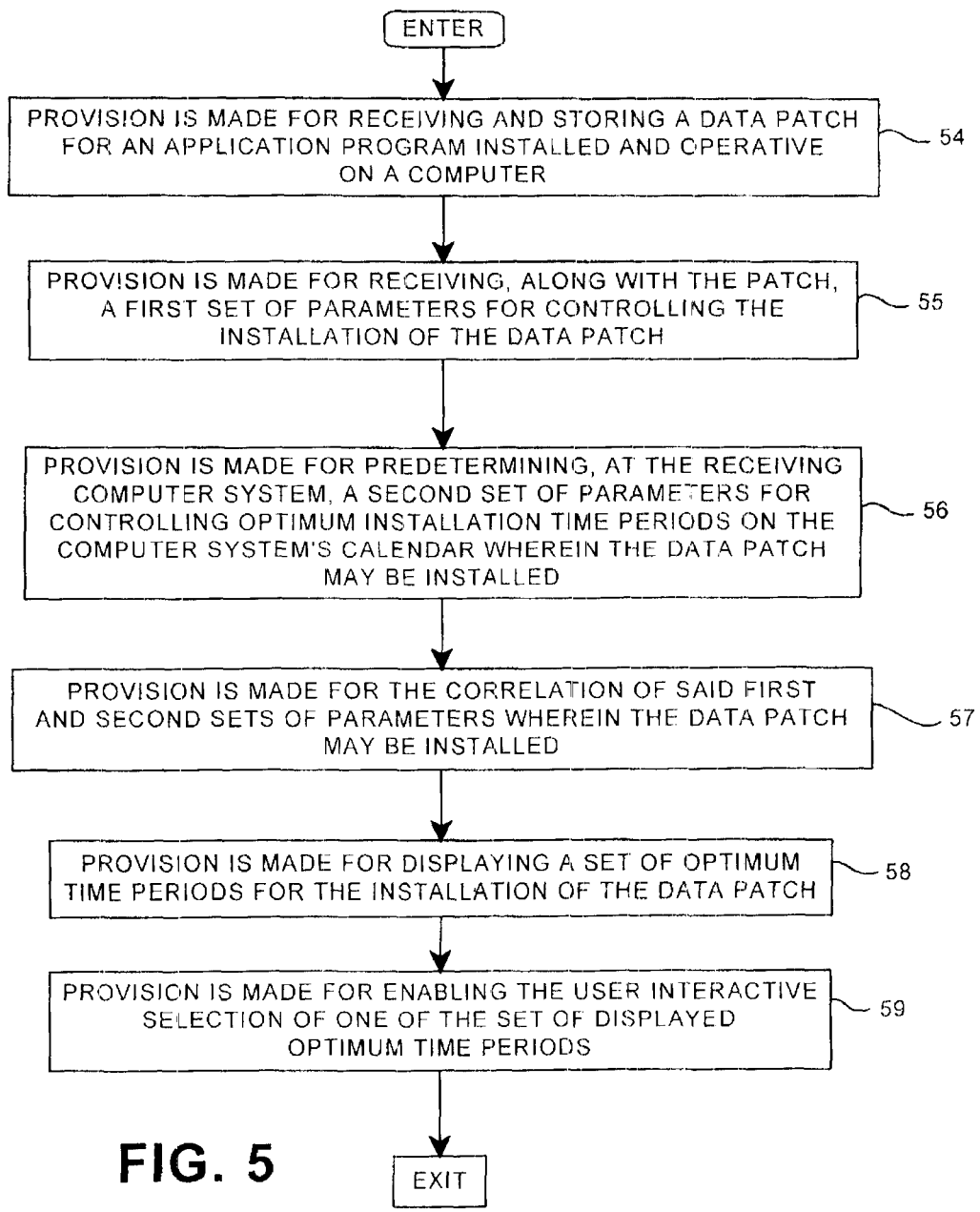
FIG. 5 is a general flowchart of a program set up to implement the present invention for determining and displaying the optimum installation times during which a corrective data patched may be installed.

Now, with respect to FIG. 5, a general flowchart of a program set up to implement the present invention for determining and displaying the optimum installation times during which a corrective data patch may be installed. Provision is made for receiving and storing a data patch for an application program installed and operating on the computer, step 54. Provision is made for receiving, along with the patch, a first set of parameters for controlling the installation of the data patch, step 55. Provision is made for predetermining, at the receiving computer system, a second set of parameters for controlling optimum installation time periods on the computer system's calendar wherein the data patch may be installed, step 56. Provision is made for the correlation of the first and second sets of parameters wherein the data patch may be installed, step 57. Provision is made for displaying a set of optimum time periods for the installation of the data patch, step 58, and provision is made for enabling the user interactive selection of one of the set of displayed optimum time periods, step 59.

Figure 6:
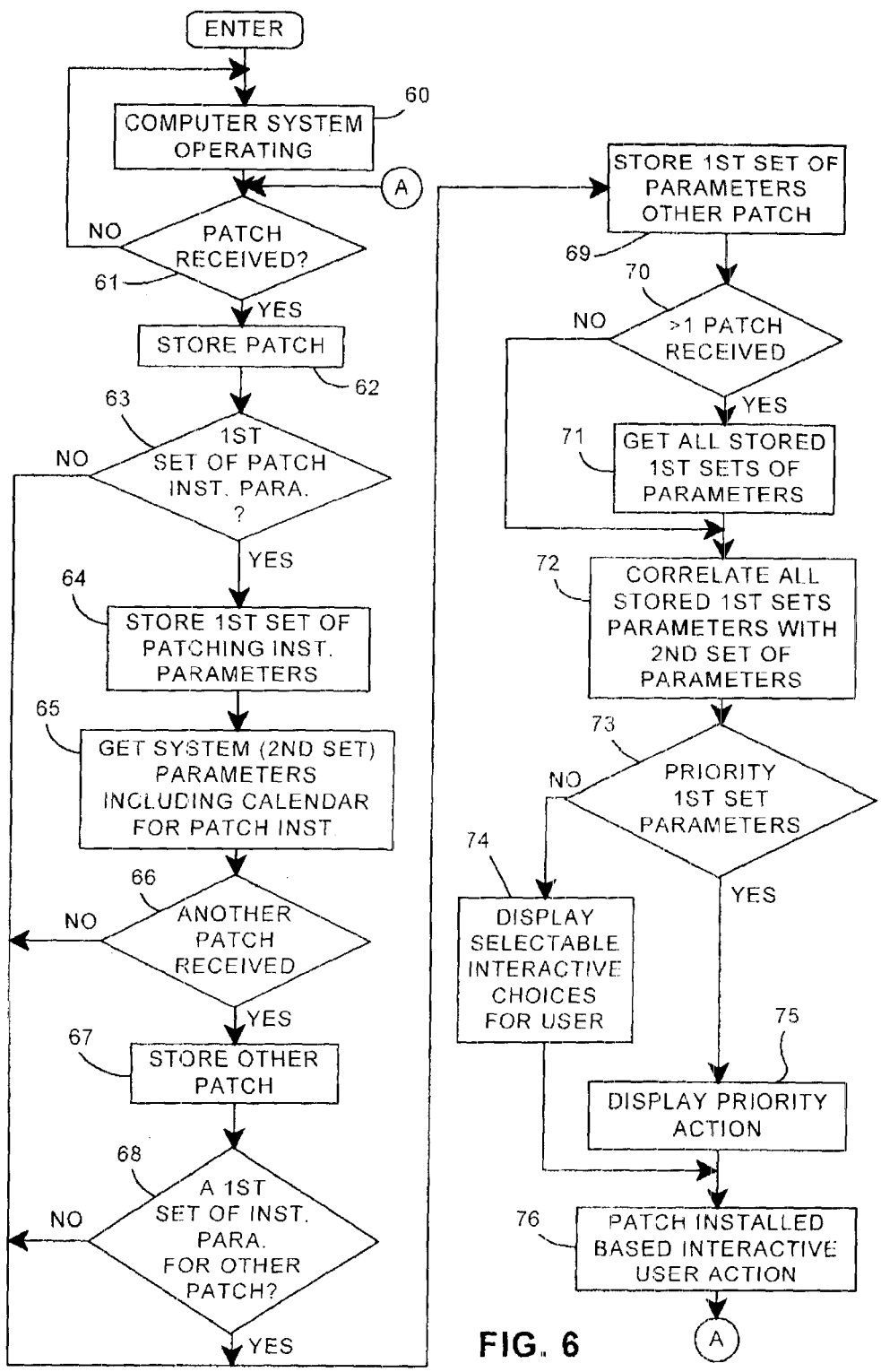
FIG. 6 is a flowchart of an illustrative run of the program set up in FIG. 5.

A simple illustrative example of a run of the process set up in FIG. 5 is described with respect to the flowchart of FIG. 6. In an operational computer system, step 60, a determination is made, step 61, as to whether a corrective data patch has been received. If No, the operation of the computer system continues. If Yes, the patch is stored, step 62. A determination is then made as to whether there has also been received a first set of parameters for controlling the data patch installation, step 63. If Yes, this first set of parameters is stored, step 64, a second set of parameters, resident in the receiving computer for controlling the installation with respect to the receiving computer system is retrieved, step 65. Next, a determination is made, step 66, as to whether another corrective data patch has been received. If Yes, the other patch is also stored, step 67. A determination is then made as to whether there has also been received a first set of parameters for controlling a data patch installation for the other patch, step 68. If Yes, the first set for the other patch is also stored, step 69. Then, or if the decisions from any of steps 63, 66 or 68 is No, a determination is then made as to whether more than one corrective data patch has been received, step 70. If Yes, all of the stored first sets of parameters for all received patches are retrieved, step 71. Then, or if the determination in step 70 is No, all of the first sets of parameters are correlated with the second set of parameters, step 72. A determination is then made, step 73, as to whether there is a critical priority required for a definite installation time, step 73. If Yes, step 75, only the critical time for installation is displayed, as in FIG. 4. If No, then, step 74, the several alternative installation dates as determined by the correlation are displayed for interactive selection, step 74. After either step 74 or 75, the patch is installed responsive to the user selection, step 76, and the process is returned to step 61 via branch "A".

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for optimum installation of a data patch for a program already installed in a computer system having a user interactive display comprising:
   receiving and storing said data patch in said computer system;
   receiving at said computer system, accompanying said data patch, a first set of parameters for controlling the installation of said data patch;
   determining from the first set of parameters whether there is a critical priority required for a definite installation time of said data patch by which the patch must be installed;
   predetermining, at said computer system, a second set of parameters for controlling optimum installation time periods on the computer system's calendar, wherein said data patch is installable;
   correlating, at said computer system, said first and second sets of parameters to determine a set of optimum time periods on the system calendar wherein said data patch is to be installed;
   receiving a selection in the display at the computer system from a user of an optimum time period for installation of said data patch;
   upon determining that the first set of parameters indicate a critical priority required for a definite installation time, displaying at said computer system only an option to install the data patch at the definite installation time; and,
   upon determining that the first set of parameters does not indicate a critical priority required for a definite installation time, displaying, at said computer system, several alternative installation dates corresponding to said set of time periods.

2. The method of claim 1, wherein said data patch is a security patch.

3. The method of claim 2, wherein said displayed set of optimum time periods consists of a single time period.

4. The method of claim 2, wherein a parameter in said first set of parameters is a duration of time required for the installation of the data patch.

5. The method of claim 2, wherein a plurality of data patches, each patch accompanied by its own first set of parameters are received and stored.

6. The method of claim 5 wherein:
   a parameter in said first set of parameters requires a reboot of the computer system; and
   said displayed set of optimum time periods consists of a single time period of the duration of time required for said reboot of the computer system.

7. The method of claim 1, wherein said second set of parameters of said computer system includes computer operating conditions requiring computer system times.

8. The method of claim 7, wherein said second set of parameters of said computer system includes computer calendar schedules.

9. A computer controlled interactive display system for optimum installation of a data patch for a program already installed in a computer system comprising:
   a processor; and
   a computer memory holding computer program instructions which when executed by the processor perform a method comprising:
   receiving and storing said data patch in said computer system;
   receiving at said computer system, accompanying said data patch, a first set of parameters for controlling the installation of said data patch;
   determining from the first set of parameters whether there is a critical priority required for a definite installation time of said data patch by which the patch must be installed;
   predetermining, at said computer system, a second set of parameters for controlling optimum installation time periods on the computer system's calendar, wherein said data patch is installable;
   correlating, at said computer system, said first and second sets of parameters to determine a set of optimum time periods on the system calendar wherein said data patch is to be installed;
   on condition that the first set of parameters indicate a critical priority required for a definite installation time, displaying at said computer system only an option to install the data patch at the definite installation time, but otherwise on condition that the first set of parameters does not indicate a critical priority required for a definite installation time, displaying, at said computer system, several alternative installation dates corresponding to said set of time periods; and,
   receiving a selection in the display at the computer system from a user of an optimum time period for installation of said data patch.

10. The system of claim 9, wherein said data patch is a security patch.

11. The system of claim 10, wherein said displayed set of optimum time periods consists of a single time period.

12. The system of claim 10, wherein a parameter in said first set of parameters is a duration of time required for the installation of the data patch.

13. The system of claim 10, wherein the performed method further includes receiving and storing a plurality of data patches, each patch accompanied by its own first set of parameters.

14. The system of claim 13 wherein:
   a parameter in said first set of parameters requires a reboot of the computer system; and
   said displayed set of optimum time periods consists of a single time period of the duration of time required for said reboot of the computer system.

15. The system of claim 9, wherein said second set of parameters of said computer system includes computer operating conditions requiring computer system times.

16. The system of claim 15, wherein said second set of parameters of said computer system includes computer calendar schedules.

17. A computer readable non-transitory storage medium having stored thereon a computer readable program for optimum installation of a data patch for a program already installed in a computer system having a user interactive display, wherein the computer readable program when executed on a computer causes the computer to:

receive and store said data patch in said computer system;

receive at said computer system, accompanying said data patch, a first set of parameters for controlling the installation of said data patch;

determine from the first set of parameters whether there is a critical priority required for a definite installation time of said data patch by which the patch must be installed;

predetermine, at said computer system, a second set of parameters for controlling optimum installation time periods on the computer system's calendar, wherein said data patch is installable;

correlate, at said computer system, said first and second sets of parameters to determine a set of optimum time periods on the system calendar wherein said data patch is to be installed;

on condition that the first set of parameters indicate a critical priority required for a definite installation time, displaying at said computer system only an option to install the data patch at the definite installation time, but otherwise on condition that the first set of parameters does not indicate a critical priority required for a definite installation time, display, at said computer system, several alternative installation dates corresponding to said set of time periods; and, receive a selection in the display at the computer system from a user of an optimum time period for installation of said data patch.

18. The computer readable non-transient storage medium of claim 17, wherein said data patch is a security patch.

19. The computer readable non-transient storage medium of claim 18, wherein said displayed set of optimum time periods consists of a single time period.

20. The computer readable non-transient storage medium of claim 18, wherein a parameter in said first set of parameters is a duration of time required for the installation of the data patch.

21. The computer readable non-transient storage medium of claim 18, wherein the computer program when executed on a computer causes the computer to receive and store a plurality of data patches, each patch accompanied by its own first set of parameters.

22. The computer readable non-transient storage medium of claim 21 wherein:

a parameter in said first set of parameters requires a reboot of the computer system; and said displayed set of optimum time periods consists of a single time period of the duration of time required for said reboot of the computer system.

23. The computer readable non-transient storage medium of claim 17, wherein said second set of parameters of said computer system includes computer operating conditions requiring computer system times.

24. The computer readable non-transient storage medium of claim 23, wherein said second set of parameters of said computer system includes computer calendar schedules.

* * * * *